Oct. 9, 1956

N. C. STOREY 2,765,664

POWER TAKE-OFF DEVICE

Filed May 27, 1954

INVENTOR
NORMAN C. STOREY

BY Young, Emery & Thompson

ATTORNEYS

Oct. 9, 1956  N. C. STOREY  2,765,664
POWER TAKE-OFF DEVICE
Filed May 27, 1954  2 Sheets-Sheet 2

INVENTOR
NORMAN C. STOREY
BY Young, Emery & Thompson
ATTORNEYS

United States Patent Office 2,765,664
Patented Oct. 9, 1956

2,765,664

POWER TAKE-OFF DEVICE

Norman Choate Storey, Escondido, Calif.

Application May 27, 1954, Serial No. 432,688

3 Claims. (Cl. 74—15.63)

This invention relates in general to power take-off devices and more particularly has reference to a power take-off device detachably mounted on the transmission case of a tractor.

Heretofore, power take-off devices have been associated with transmission cases of various types of vehicles, including tractors, by attaching such devices to the exterior portion of such transmission case. In constructions of this type, the housing for the power take-off projects from the exterior wall of the transmission case and in many instances has been found to be unsightly and disadvantageous in that it requires considerable space that could be occupied by other mechanisms.

In attaching rotary tillers and other types of farm machinery to tractors and coupling the driving shaft of the rotary tiller or other machinery to a power take-off of a tractor according to the prior art, it has been necessary to extend the coupling between the tiller and the tractor in order to accommodate the externally mounted power take-off housing for transmitting power from the tractor to the cultivator.

The major object of the present invention is to provide a power take-off device for tractors and similar vehicles in which the disadvantages of the prior art are avoided.

Another object of this invention is to provide a power take-off device, the housing of which extends into the transmission case of the tractor or other vehicle.

A further object of my invention is to provide a device to transmit the motive power of a tractor for auxiliary use through an auxiliary clutch provided in the transmission case of the tractor, and deliver the power outside and close to the wall of said transmission case.

Yet another object of this invention is to provide a power take-off device in the form of a self-contained unit, simple in construction and capable of being easily installed and dismounted.

Still another object of this invention is to provide an auxiliary power take-off device incorporating a clutching means within the transmission case of a tractor where because of the nature of the apparatus to be driven through the auxiliary power take-off device, it is imperative to have the external power connection close to the transmission case of the tractor.

A still further object of this invention is to provide a power take-off device which is self-contained, of simple construction and involves a minimum obstruction when in and out of use.

These and other objects of this invention will appear more fully hereinafter in the description and in the accompanying drawings.

Figure 1:
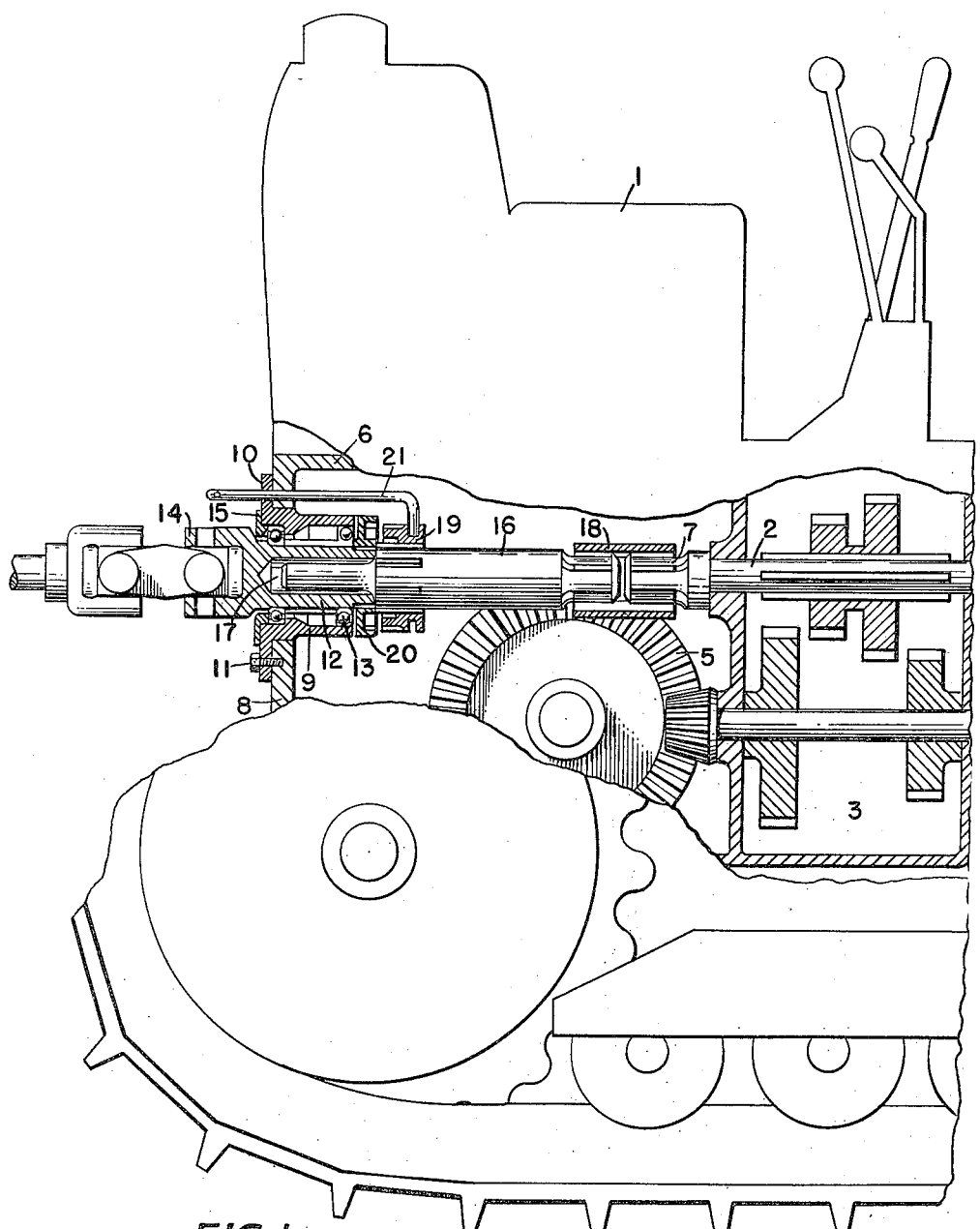
Figure 1 is a somewhat diagrammatic fragmentary sectional view of a tractor and its transmission case.

The power take-off device of this invention is particularly suitable for use with a tractor 1 having an engine driven shaft 2, a change speed transmission 3 in a housing 4 for transmitting motive power from shaft 2 to the wheel driving transmission mechanism 5 enclosed in transmission case 6. Shaft 2 has a splined portion 7 extending into the transmission case 6 which serves as a connection for attachment of a power take-off device. For this purpose, the rear wall 8 of case 6 is provided with an access opening axially aligned with shaft 2 to enable a shaft or other means to extend therethrough from the exterior for connection with the splined portion 7 of shaft 2.

Power take-off devices as used heretofore generally included a housing mounted entirely on the exterior of the transmission case and provided with a shaft extending into the case and connected to shaft 2.

According to the present invention, the power take-off device comprises a tubular bearing housing 9 extending into the opening in the rear wall 8 of the transmission case in axial alignment with shaft 2. The outer end of housing 9 is provided with a peripheral supporting flange 10 having a series of circumferentially spaced bolt holes formed therein. A plurality of bolts 11, only one of which is shown, extend through the bolt holes and are screwed into threaded bores in the rear wall 8 for rigidly fixing the flange 10 and the bearing housing extending therefrom to the wall 8 of the transmission case.

A driven power shaft 12 is journalled in suitable bearings 13 in bearing housing 9. The outer end of shaft 12 is provided with a connection 14 by means of which shaft 12 can be coupled to means to be driven. A seal 15 of any desired construction, shown only diagrammatically in Fig. 1, is provided on the flange 10.

For transmitting rotary motion from the engine driven shaft 2 which serves as a drive shaft for the power take-off to the power shaft 12 to be driven, there is provided an intermediate shaft 16 which is journalled at one end in a bore 17 in the inner end of shaft 12 for free relative rotation. The other end of the intermediate shaft 16 is splined and coupled by a coupling 18 to the splined end of shaft 2.

Adjacent the inner end of shaft 9, the intermediate shaft 16 is splined and carries an internally splined axially shiftable clutch member 19.

This clutch member 19 is provided with teeth for cooperating with teeth in a clutch element 20 keyed on the inner external portion of shaft 9 for detachably coupling shaft 9 to the intermediate shaft 16. A clutch actuator 21 having a fork mounted in a groove on the clutch member 19 extends through an opening in the rear wall 8 of the transmission case so that the clutching means can be easily manipulated to engage or disengage the clutch.

Figure 2:
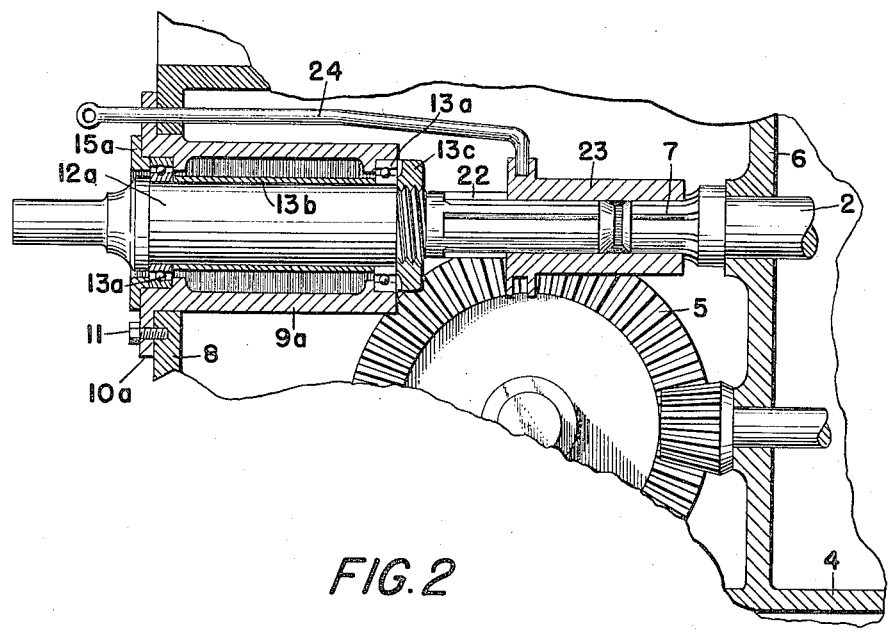
Figure 2 is another fragmentary sectional view showing a simplified form of the power take-off.

A simplified form of power take-off device is shown in Figure 2 of the drawings. In this form of power take-off a tubular bearing housing 9a is provided which extends into the opening in the rear wall 8 of the transmission case in axial alignment with shaft 2. The outer end of the housing 9a, as in the case of Figure 1, is provided with a peripheral supporting flange 10a which is secured in place by a plurality of bolts 11 threaded into suitable bores in the rear wall 8 for rigidly fixing the flange 10a and the bearing housing carried thereby to the wall 8.

As in the case of Figure 1, a driven power shaft 12a is journalled in suitable bearings 13a in the housing 9a. The outer end of the shaft may be formed in any suitable manner to receive a pulley or any other means for transmitting motion to a mechanism to be driven. A seal 15a is provided on the flange 10a. A spacer 13b is mounted on the shaft 12a between the bearings 13a. On the rear portion of shaft 12a, there is provided a thread for receiving a bearing retaining nut 13c.

The inner end portion 22 of the shaft 12a is of substantially the same diameter as the splined portion 7 of the drive shaft 2 and is correspondingly splined. Slidably mounted on the splined portion 22 of the shaft is an internally splined coupling sleeve 23 which is adapted to be moved axially on the splined portion 22 of the shaft by means of a suitable actuator rod 24 extending through a suitable opening in the rear wall 8 of the gear case 6 in substantially the same manner as indicated in Figure 1 of the drawings. The inner end of the actuator 24 is mounted in an annular groove carried by the rear peripheral portion of the coupling 23. When the driven shaft 12a is disconnected from the drive shaft 2, the coupling 23 is pulled rearwardly so as to completely disengage the splined portion 7 of the drive shaft 2. When the power take-off shaft 12a is to be rotated, the coupling 23 is moved axially forward by the actuating device 24 so as to couple the splined portion 7 of the drive shaft 2 to the splined portion 22 of the drive shaft 12a of the power take-off.

Obviously, the power take-off device of the present invention is very compact and provides a minimum obstruction outside of the transmission case. This makes it especially suitable for use in transmitting rotary motion to a machine attached to the tractor.

From the foregoing, it will be appreciated that the present invention provides a structure which has many advantages over the prior art structure.

Having described my invention, I claim:

1. A power take-off device for a tractor having a transmission, a case for said transmission provided with an access opening in one end thereof and a power take-off driving shaft in the case axially aligned with said opening in the end of the case, said take-off device comprising a tubular bearing housing extending into the transmission case in axial alignment with the take-off driving shaft, a flange on the outer end of said housing, means attaching the flange to the case about the opening for fixing the bearing housing to the case, a driven shaft rotatably mounted in said bearing housing in axial alignment with the driving shaft, said driven shaft having an axially extending socket in its inner end, an intermediate shaft extending between the driving and driven shafts, means connecting one end of the intermediate shaft to the driving shaft, the other end of the intermediate shaft extending into and rotatably mounted in said socket, means in the transmission case for clutching and declutching the driven shaft to the intermediate shaft, and connecting means carried by the driven shaft and on the exterior of said case and housing.

2. A power take-off device for a tractor having a transmission, a case for said transmission provided with an access opening in one end thereof and a power take-off driving shaft in the case axially aligned with said opening in the end of the case, said take-off device comprising a tubular bearing housing extending into the transmission case in axial alignment with the take-off driving shaft, a flange on the outer end of said housing, means attaching the flange to the case about the opening for fixing the bearing housing to the case, a driven shaft rotatably mounted in said bearing housing in axial alignment with the driving shaft, an intermediate shaft extending between the driving and driven shafts, means connecting one end of the intermediate shaft to the driving shaft, a clutch member axially slidably mounted on and splined to the other end portion of the intermediate shaft, a clutch element carried by the driven shaft, means extending through the case to the exterior thereof for shifting the slidable clutch member into and out of engagement with the clutch element carried by the driven shaft, means for fixing the bearing housing to the case about said opening, a driven shaft rotatably mounted in said bearing housing, means in the transmission case for clutching and declutching the driven shaft to the driving shaft, and connecting means carried by the driven shaft and on the exterior of said case and housing.

3. A power take-off device for a tractor having a transmission, a case for said transmission provided with an access opening in one end thereof and a power take-off driving shaft in the case axially aligned with said opening in the end of the case, said take-off device comprising a tubular bearing housing extending into the transmission case in axial alignment with the take-off driving shaft, a flange on the outer end of said housing, means attaching the flange to the case about the opening for fixing the bearing housing to the case, a driven shaft rotatably mounted in said bearing housing in axial alignment with the driving shaft, said driven shaft having an axially extending socket in its inner end, an intermediate shaft extending between the driving and driven shafts, means connecting one end of the intermediate shaft to the driving shaft, the other end of the intermediate shaft extending into and rotatably mounted in said socket, a clutch member axially slidably mounted on and splined to the other end portion of the intermediate shaft, a clutch element carried by the driven shaft, means extending through the case to the exterior thereof for shifting the slidable clutch member into and out of engagement with the clutch element carried by the driven shaft, means for fixing the bearing housing to the case about said opening, a driven shaft rotatably mounted in said bearing housing, means in the transmission case for clutching and declutching the driven shaft to the driving shaft, and connecting means carried by the driven shaft and on the exterior of said case and housing.

References Cited in the file of this patent

UNITED STATES PATENTS

| | | |
|---|---|---|
| 1,023,084 | Luitweiler | Apr. 9, 1912 |
| 2,489,699 | Clark | Nov. 29, 1949 |